US007991783B2

(12) United States Patent
Flynn, Jr. et al.

(10) Patent No.: US 7,991,783 B2
(45) Date of Patent: Aug. 2, 2011

(54) APPARATUS, SYSTEM, AND METHOD FOR SUPPORTING STORAGE FUNCTIONS USING AN EMBEDDED DATABASE MANAGEMENT SYSTEM

(75) Inventors: John Thomas Flynn, Jr., Morgan Hill, CA (US); Balakrishna Raghavendra Iyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/958,954

(22) Filed: Oct. 5, 2004

(65) Prior Publication Data

US 2006/0074941 A1  Apr. 6, 2006

(51) Int. Cl.
 *G06F 17/00* (2006.01)
 *G06F 7/00* (2006.01)
(52) U.S. Cl. ............................. 707/759; 710/5
(58) Field of Classification Search ................ 707/3, 10, 707/1, 759; 709/223, 224, 203
See application file for complete search history.

(56) References Cited

U.S. PATENT DOCUMENTS

| 5,778,411 | A | 7/1998 | DeMoss et al. ............... 711/4 |
| 5,878,422 | A | 3/1999 | Roth et al. ............... 707/100 |
| 6,185,665 | B1 | 2/2001 | Owada et al. ............... 711/170 |
| 6,195,650 | B1 | 2/2001 | Gaither et al. ............... 707/1 |
| 6,574,705 | B1 | 6/2003 | Peloquin et al. ............. 711/114 |
| 6,654,769 | B2 | 11/2003 | Ito et al. ............... 707/200 |
| 6,883,083 | B1 * | 4/2005 | Kemkar ............... 711/203 |
| 7,143,288 | B2 * | 11/2006 | Pham et al. ............... 713/165 |
| 7,181,439 | B1 * | 2/2007 | Lent et al. ............... 707/2 |
| 7,203,663 | B1 * | 4/2007 | Buisman et al. ............... 705/38 |
| 7,856,522 | B2 * | 12/2010 | Lee et al. ............... 711/103 |
| 2002/0112113 | A1 | 8/2002 | Karpoff et al. ............... 711/4 |
| 2003/0115218 | A1 | 6/2003 | Bobbitt et al. ............... 707/200 |
| 2003/0140070 | A1 | 7/2003 | Kaczmarski et al. ......... 707/204 |
| 2003/0154236 | A1 | 8/2003 | Dar et al. ............... 709/201 |
| 2003/0191904 | A1 | 10/2003 | Iwami et al. ............... 711/147 |
| 2003/0225830 | A1 * | 12/2003 | Kataoka et al. ............... 709/203 |

(Continued)

FOREIGN PATENT DOCUMENTS

IN  200500414 I3  *  5/2007

(Continued)

OTHER PUBLICATIONS

Gibson et al, Network Attached Storage Architecture, ACM, Nov. 2000, pp. 37-45.*

(Continued)

*Primary Examiner* — Luke S Wassum

(74) *Attorney, Agent, or Firm* — Kunzler Needham Massey & Thorpe

(57) ABSTRACT

An apparatus, system, and method are disclosed for supporting storage functions using an embedded database management system. The apparatus includes a disk controller configured to receive input/output (I/O) requests from a host, an embedded database management system module, and a conversion module configured to translate the input/output requests into database requests and communicate the database requests with the embedded database management system module. The system may include the apparatus, a network, and a plurality of storage devices coupled to the network and configured to store data. The method includes receiving input/output (I/O) requests from a host, translating the input/output requests into database requests, communicating the database requests with an embedded database management system module, and executing the database requests.

24 Claims, 7 Drawing Sheets

U.S. PATENT DOCUMENTS

| | | | |
|---|---|---|---|
| 2003/0229645 A1 | 12/2003 | Mogi et al. | 707/102 |
| 2003/0236919 A1* | 12/2003 | Johnson et al. | 709/251 |
| 2004/0019706 A1* | 1/2004 | Smith | 710/1 |
| 2004/0162836 A1* | 8/2004 | Aronoff et al. | 707/100 |

FOREIGN PATENT DOCUMENTS

| | | |
|---|---|---|
| JP | 8008754 A | 1/1996 |

OTHER PUBLICATIONS

Kim, J., J.M. Kim, S.H. Noh, S.L. Min and Y. Cho "A Space-Efficient Flash Translation Layer for CompactFlash Systems", IEEE Transactions on Consumer Electronics, vol. 48, No. 2, May 2002, pp. 366-375.*

Bolchini, C., F. Salice, F.A. Schreiber and L. Tanca "Logical and Physical Design Issues for Smart Card Databases", ACM Transactions on Information Systems, vol. 21, No. 3, Jul. 2003, pp. 254-285.*

Kim, G-J., S-C. Baek, H-S. Lee, H-D. Lee and M.J. Joe "LGeDBMS: A Small DBMS for Embedded Systems with Flash Memory", Proceedings of the Conference on Very Large Databases (VLDB), Sep. 12-15, 2006, pp. 1255-1258.*

Lee, K.Y., H. Kim, K-G. Woo, Y.D. Chung and M.H. Kim "Design and Implementation of MLC NAND Flash-Based DBMS for Mobile Devices", The Journal of Systems and Software, vol. 82, 2009, pp. 1447-1458.*

\* cited by examiner

APPARATUS, SYSTEM, AND METHOD FOR SUPPORTING STORAGE FUNCTIONS USING AN EMBEDDED DATABASE MANAGEMENT SYSTEM

BACKGROUND OF THE INVENTION

1. Field of the Invention

This invention relates to input/output (I/O) tasks and data transfer between storage devices, and more particularly relates to supporting storage functions using an embedded database management system.

2. Description of the Related Art

The explosion of data created by e-business is making storage a strategic investment priority for companies of all sizes. As storage takes precedence, two major concerns have emerged: business continuity and business efficiency. Business continuity requires storage that supports data availability so employees, customers and trading partners can access data continuously through reliable, disaster-tolerant systems. Business efficiency, where storage is concerned, is the need for investment protection, reduced total cost of ownership and high performance and manageability.

In order to maintain the large amounts of data created and collected, storage area networks (SANs) have been developed. The Storage Network Industry Association (SNIA) defines SAN as a network whose primary purpose is the transfer of data between computer systems and storage elements. A SAN may comprise a communication infrastructure, which provides physical connections; and a management layer, which organizes the connections, storage elements, and computer systems so that data transfer is secure and robust. A SAN may also be a storage system comprising storage elements, storage devices, computer systems, and/or appliances, plus all control software, communicating over a network.

Commonly, a storage area network includes a plurality of storage devices, such as tape drives or hard disk drives, connected with a storage or disk controller. The disk controller is generally a server that is configured to process read/write requests from hosts or client machines. The hosts may be running a variety of operating systems such as Windows, Linux, UNIX, AIX, etc. In large computing environments, the storage area network is an ideal solution for providing large amounts of storage and scalable server or storage controller performance.

Typically, in a storage area network environment, a host requests data from the disk controller. The disk controller then retrieves the data from the particular storage device that contains the requested data, often referred to as a home location. The disk controller then sends the data to the host. If the host modifies the data, the data is sent back to the disk controller which returns the modified data to the home location. Typically, the host awaits a response from the disk controller indicating that the read or write operation has completed.

The disk controller may also provide functions such as the ability to access devices by heterogeneous servers, a data cache, data availability features such as various RAID implementations, scalability, virtualization of devices, and replication services.

Virtualization of devices is the ability to present an image of a storage device that is independent of the actual media on which the data is stored. Virtualization also includes the ability to store the data in a format different from the format which is seen by a server on a virtualized device as well as the ability to compress and encrypt the data. When multiple servers have access to the same device, a disk controller must implement data integrity functions that include serialization, locking, currency, and coherency control.

Replication services include both point-in-time copies and mirror copies of data on storage devices. A point-in-time copy is an image of data on a device that represents the state of the data at the time the copy was taken. Point-in-time copies can be a complete replica of the original data or can be a sparse copy which is just the data necessary to recreate the image of the data at the time the copy was taken. A mirror copy is continuous duplication of data on a device and can be a complete replica of the data or the data necessary to recreate the mirror copy such as a log file. Duplication may be done synchronously or asynchronously and is generally used to create a copy of the data at some distance from the original for backup and disaster recovery purposes.

FIG. 1 is a schematic block diagram illustrating one embodiment of a network 100 for supporting storage functions in accordance with the prior art. The network 100 may include a plurality of hosts 102 coupled to a storage call flow network 104. In one embodiment, the storage call flow network 104 may comprise a Storage Area Network (SAN) supporting a command interface such as Small Computer Systems Interface (SCSI) requests or a Local Area Network (LAN) supporting Internet SCSI (iSCSI) requests.

Each host 102 traditionally includes a device driver 106 configured to communicate over the storage call flow network 104 with target code 108 of a disk controller 110. Each host 102 may have a different operating system such as, but not limited to, Windows®, Linux®, UNIX®, and AIX®. The device driver 106 is host 102 specific and must be developed to function with the host 102 operating system. The device driver 106 may be configured to receive a final system request or a generic input/output (I/O) request and convert the I/O request into a protocol being used on the disk controller 110, typically SCSI protocol.

The target code 108 is configured to receive and execute the I/O request on a plurality of storage devices 112. The storage devices are coupled with the disk controller 110 using an interconnect 114. Storage device interconnects 114 are well known to those skilled in the art and will not be given further discussion herein.

Storage requirements change along with changes in business practices. Advanced storage features are constantly being developed for storage subsystem disk controllers. Despite the benefits of such storage subsystems, adding advanced storage features to the disk controller requires discreet electronics to be engineered or unique microcode to be written and debugged. However, many of these advanced storage features have been implemented and tested in Database Management Systems (DBMS). Consequently, it is believed that a need exists for an apparatus, system, and method that would support storage functions using an embedded DBMS. Beneficially, such an apparatus, system, and method would combine the established storage functions of the DBMS with the scalability and performance of storage subsystems.

SUMMARY OF THE INVENTION

The present invention has been developed in response to the present state of the art, and in particular, in response to the problems and needs in the art that have not yet been fully solved by currently available disk controllers. Accordingly, the present invention has been developed to provide an apparatus, system, and method for supporting storage functions using an embedded database management system that overcome many or all of the above-discussed shortcomings in the art.

The apparatus to support storage functions using an embedded database management system is provided with a logic unit containing a plurality of modules configured to functionally execute the necessary steps of translating input/output (I/O) requests into database requests. These modules in the described embodiments include a disk controller configured to receive input/output (I/O) requests from a host, and having an embedded database management system module, a conversion module configured to translate the input/output requests into database requests and communicate the database requests with the embedded database management system module, and the embedded database management system (DBMS) module configured to execute the database requests.

In one embodiment, the disk controller may include a table module having at least a first field for storage device identification and a second field for content storage, the table module configured to emulate a virtual disk. The table may also include a plurality of fields configured to maintain information describing the second field.

In a further embodiment, the apparatus includes a plurality of storage devices configured to communicate with the disk controller, execute the database requests, and store data associated with the database request. The conversion module may be configured to communicate the database request with a plurality of embedded DBMS modules and a plurality of table modules for synchronous and asynchronous replication of the data.

In one embodiment, the conversion module is further configured to translate an I/O write request into a database insert request and translate an I/O read request into a database read request. The input/output requests may comprise a command interface such as Small Computer System Interface (SCSI) commands over a storage area network, or alternatively, Internet Small Computer System Interface (iSCSI) commands transmitted over a packet switching network.

A system of the present invention is also presented to support storage functions using an embedded database management system. In particular, the system, in one embodiment, includes a network, and a plurality of storage devices coupled to the network and configured to store data. In one embodiment, the system includes a disk controller configured to receive input/output (I/O) requests from a host, communicate the I/O requests with the plurality of storage devices over the network, and the disk controller having an embedded database management system module.

In a further embodiment, the system includes a conversion module configured to translate the input/output requests into database requests and communicate the database requests with the embedded database management system module, and the embedded database management system (DBMS) module configured to execute the database requests.

A method of the present invention is also presented for supporting storage functions using an embedded database management system. The method in the disclosed embodiments substantially includes the steps necessary to carry out the functions presented above with respect to the operation of the described apparatus and system. In one embodiment, the method includes receiving input/output (I/O) requests from a host, translating the input/output requests into database requests and communicating the database requests with an embedded database management system module, and executing the database requests.

The method also may include communicating with a disk controller, executing the database requests, and storing data associated with the database request. In a further embodiment, the method includes communicating the database request with a plurality of embedded DBMS modules and a plurality of table modules for synchronous and asynchronous replication of the data.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
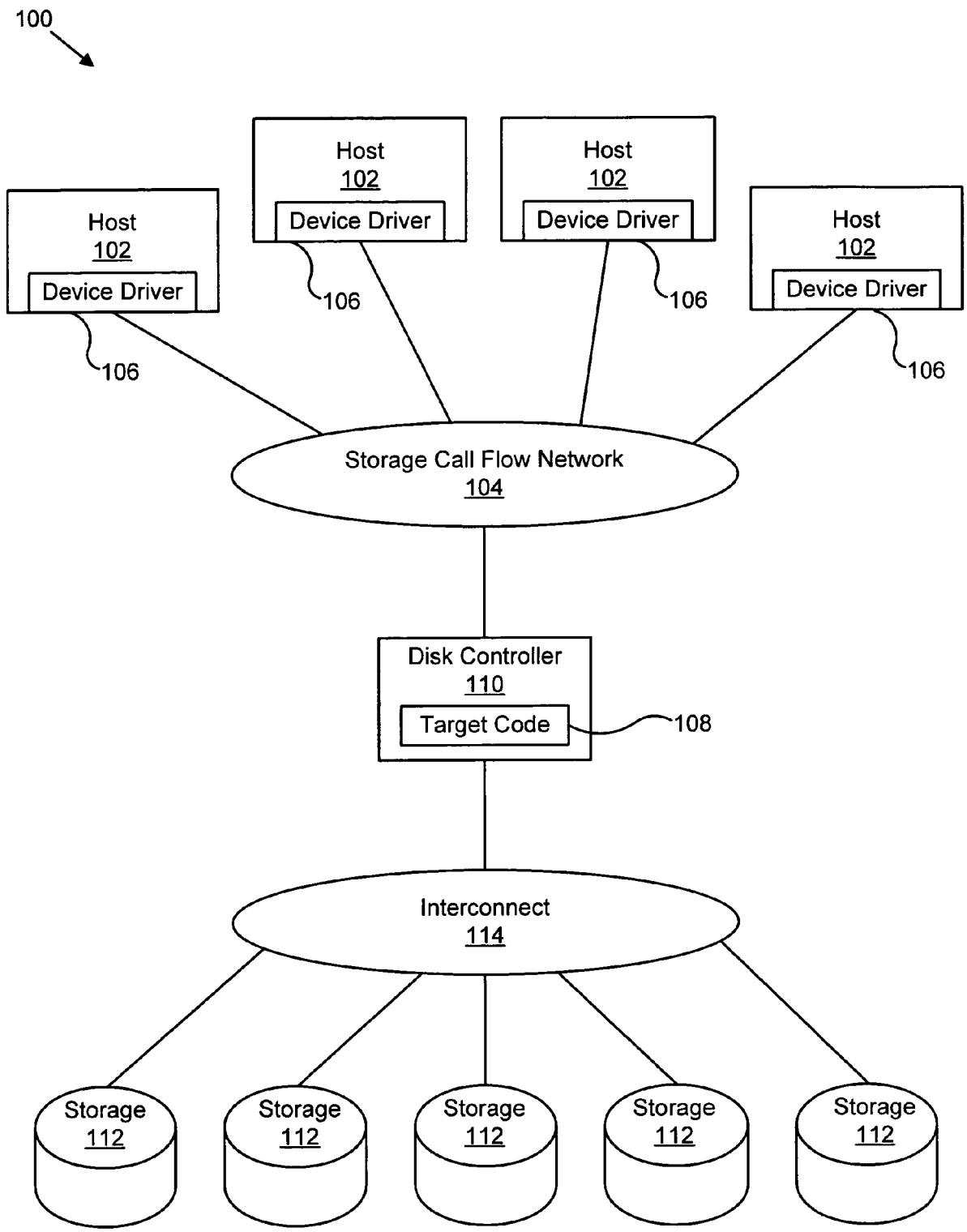
FIG. 1 is a schematic block diagram illustrating one embodiment of a network for supporting storage function in accordance with the prior art.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
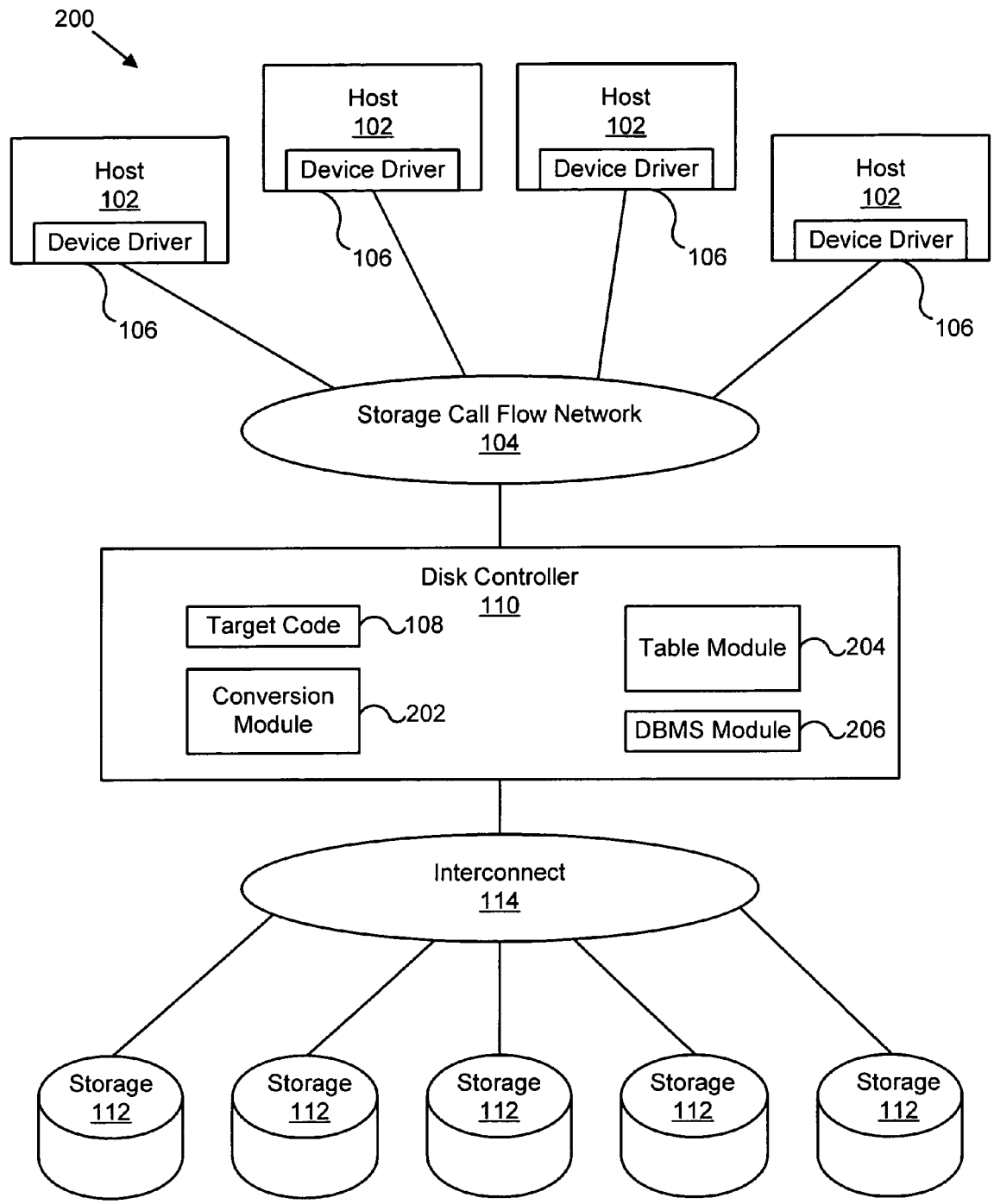
FIG. 2 is a schematic block diagram illustrating one embodiment of a network having an embedded Database Management System for supporting storage functions in accordance with the present invention.

FIG. 2 depicts schematic block diagram illustrating one embodiment of a network 200 for supporting storage functions in accordance with the present invention. The network 200 may comprise the plurality of hosts 102, storage call flow network 104, device drivers 106, target code 108, disk controller 110, storage devices 112, and interconnect 114 as described above with reference to FIG. 1. Examples of disk controllers 110 suitable for use with the present invention include, but not limited to, the IBM TotalStorage SAN Volume Controller, or IBM TotalStorage Enterprise Storage Subsystem, both available from IBM Corporation of Armonk, N.Y.

In one embodiment, the disk controller 110 includes a conversion module 202, a table module 204, and a Database Management System (DBMS) server 206. In a further embodiment, the target code 108 is configured to communicate input/output (I/O) requests with the conversion module 202. The conversion module 202 may be configured to translate the I/O requests into database requests, and will be described in greater detail below with reference to FIG. 3.

The embedded DBMS module 206 may, in one embodiment, comprise an off-the-shelf DBMS software component. Any suitable DBMS software component may be used. One example of an off-the-shelf DBMS software component suitable for use with the present invention is DB2 available from IBM Corporation.

Figure 3:
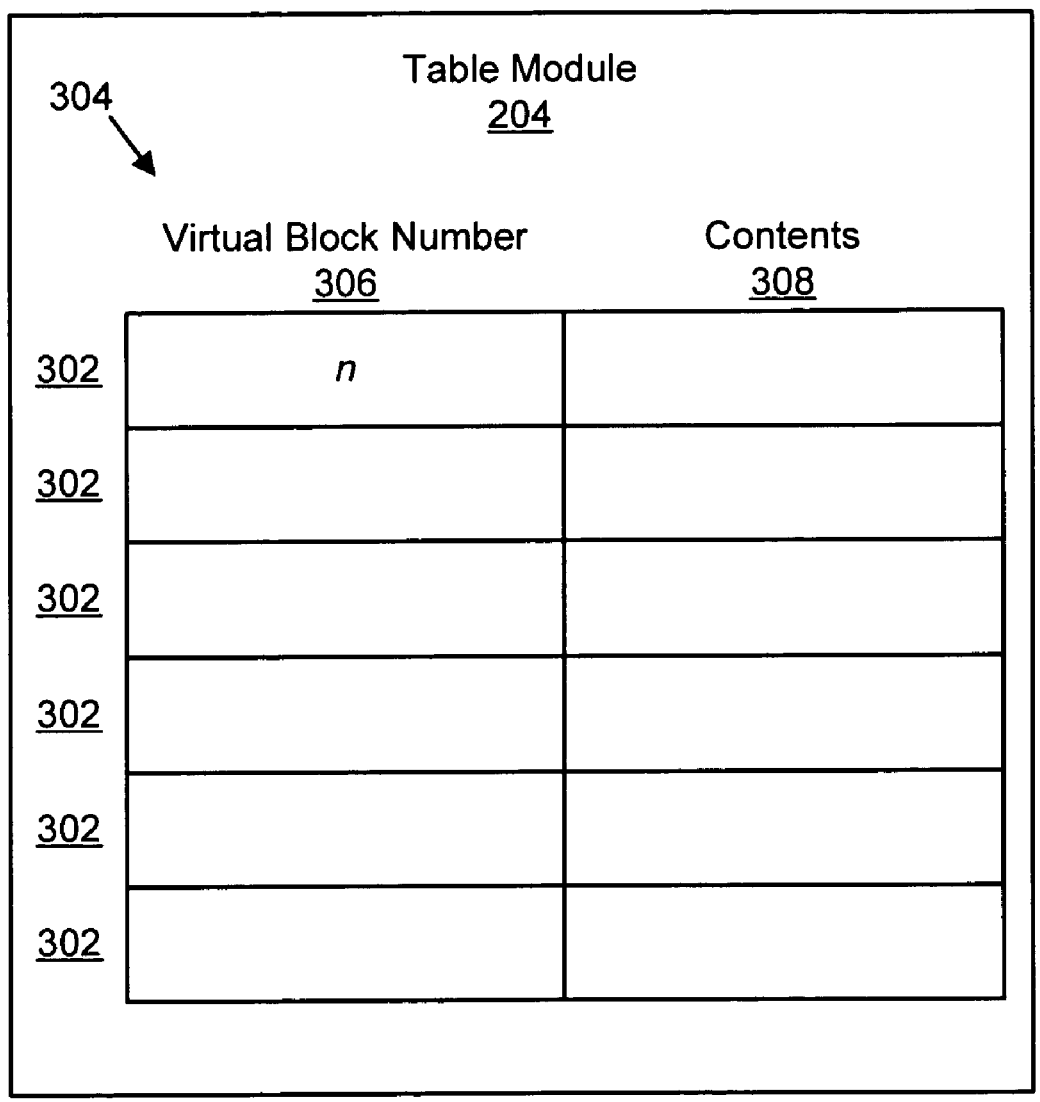
FIG. 3 is a schematic block diagram illustrating one embodiment of a table module in accordance with the present invention.

FIG. 3 is a schematic block diagram illustrating one embodiment of the table module 204 in accordance with the present invention. The table module 204 is configured to emulate a virtual storage device and maintain a plurality of records 302. The virtual storage device is a collection of database records. For example, in a relational DBMS, a collection of records 302 forms a table 304. Storage for tables may be defined to the DBMS module 206 as extents or continuous sets of blocks of a block vector of a storage device. Each record 302 may comprise at least two fields. A first field containing a storage identifier, or virtual block number 306, and a second field having data contents 308 needed to reconstruct the virtual block.

In one embodiment, an I/O request to a virtual block number 306$n$ is translated by the conversion module 202 into a DBMS fetch or update request for the record 302 whose virtual block number 306 field contains the value n. The data contents 308 associated with the virtual block number 306$n$ may then be retrieved or updated by the DBMS module 206. In a further embodiment, a new I/O request to create a virtual block, for example, a SCSI format unit command, with a virtual block number 306$x$ with given data is translated by the conversion module 202 into a DBMS insert request. Likewise, an I/O request to remove a virtual block is translated by the conversion module 202 into a DBMS delete request.

Figure 4:
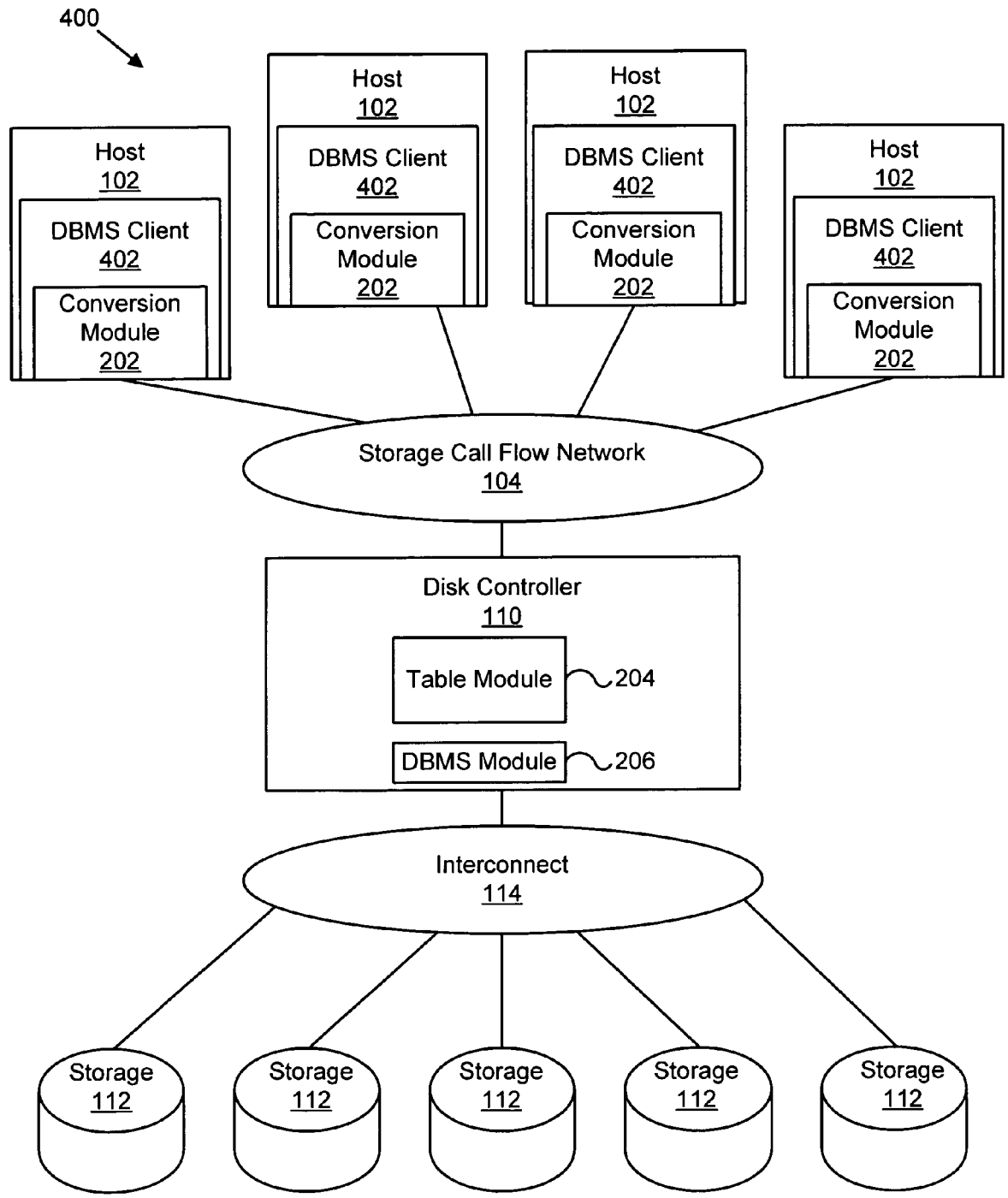
FIG. 4 is a schematic block diagram illustrating an alternative embodiment of a network having an embedded Database Management System for supporting storage functions in accordance with the present invention.

FIG. 4 is a schematic block diagram illustrating an alternative embodiment for a network 400 for supporting storage functions using an embedded DBMS in accordance with the present invention. In one embodiment, a DBMS client module 402 is configured to replace the device driver 106. The DBMS client module 402 may alternatively incorporate the device driver 106. The conversion module 202 may be implemented within the host 102 in order to reduce the burden of I/O request translations or conversions.

Each host 102 may communicate with the disk controller 110 through the storage call flow network 104 as described above. The storage call flow network 104 may be configured to enable the flow of DBMS calls. Such a network could be an Internet Protocol network or a modified Storage Area Network (SAN) with the SAN protocol modified to allow for Structured Query Language (SQL) flow. Under the depicted embodiment, I/O requests flow on the network 400 as SQL calls, which is a mature, open standards based application program interface, easily integrated architecture.

Figure 5:
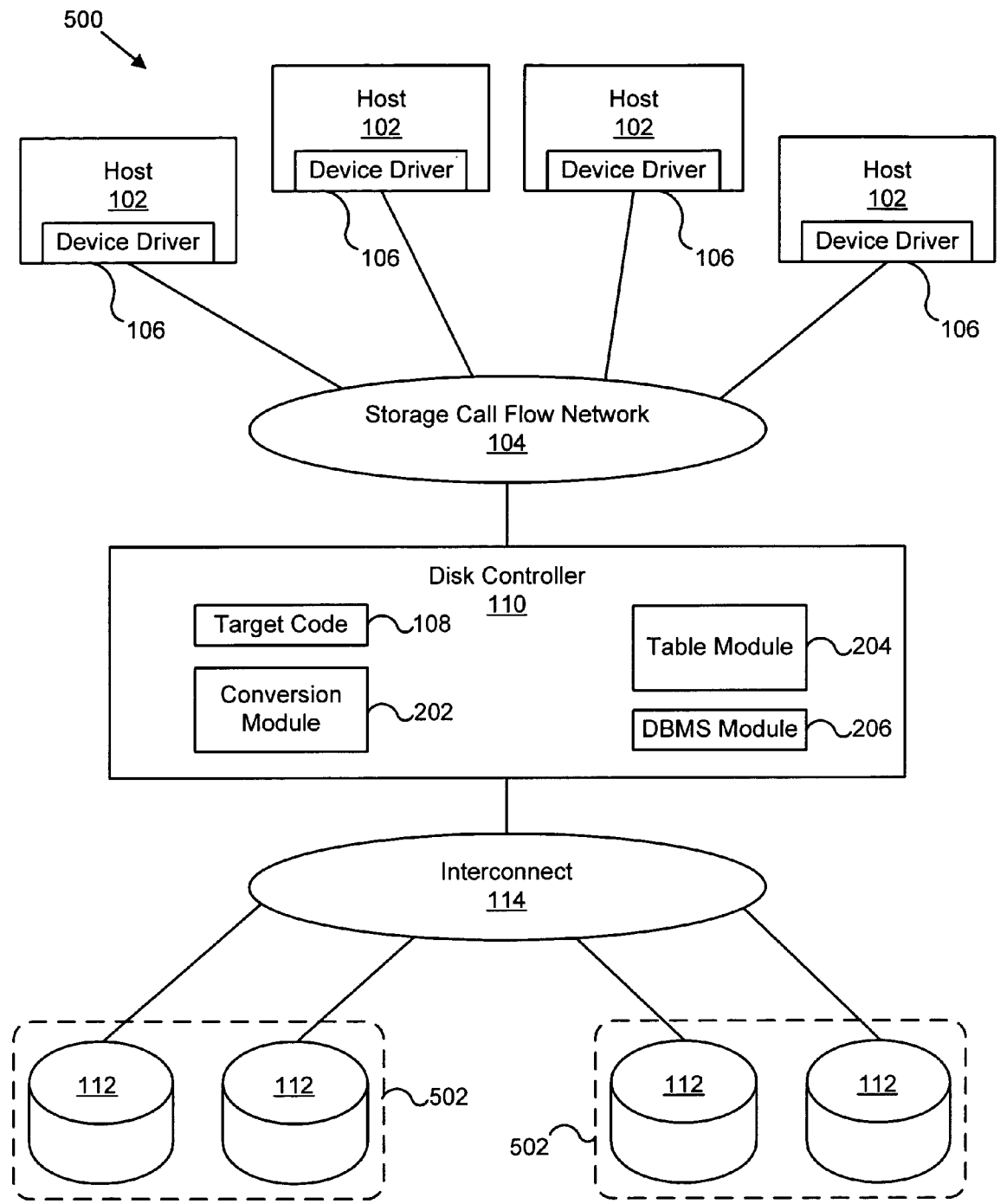
FIG. 5 is a schematic block diagram illustrating an alternative embodiment of a network having an embedded Database Management System for supporting storage functions in accordance with the present invention.

FIG. 5 is a schematic block diagram illustrating an alternative embodiment of a network 500 for supporting storage functions in accordance with the present invention. In one embodiment, the network 500 may include a plurality of Redundant Array of Inexpensive Disks (RAID) 502. As depicted, each RAID 502 comprises two storage devices 112. Alternatively, each RAID 502 may comprise a plurality of storage devices 112, the quantity of storage devices 112 depending upon a desired RAID level.

RAID functionality greatly enhances data availability on storage devices 112 managed by the disk controller 110. Throughput and reliability are greatly increased using RAID implementations 502. However, a disk controller 110 is limited in the number of physical storage devices 112 that may be managed. In order to overcome this physical limitation, multiple disk controllers 110 may be implemented (see FIG. 6).

Figure 6:
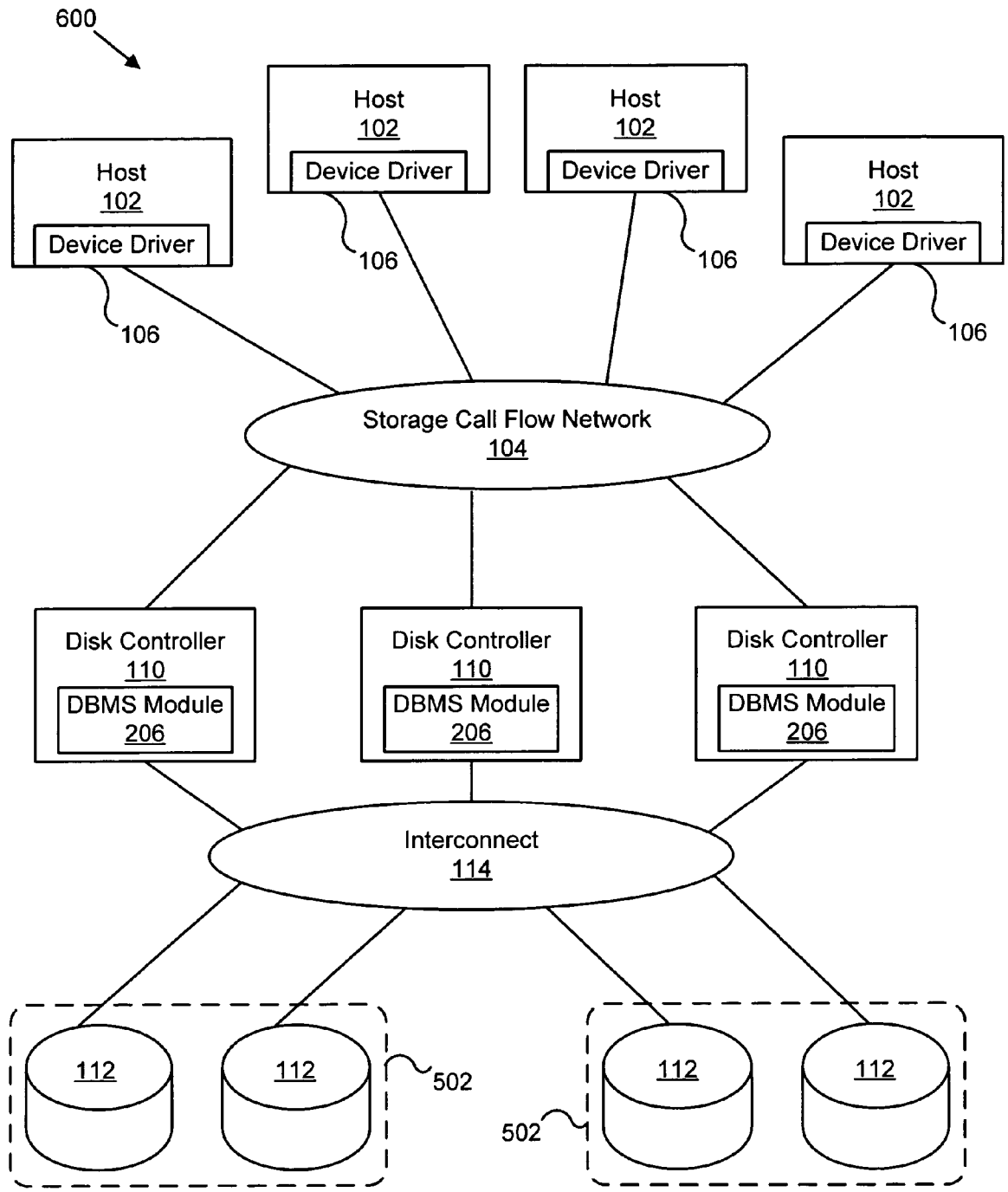
FIG. 6 is a schematic block diagram illustrating an alternative embodiment of a network having an embedded Database Management System for supporting storage functions in accordance with the present invention.

FIG. 6 is a schematic block diagram illustrating one embodiment of a network 600 for supporting storage functions in accordance with the present invention. In one embodiment, the network 600 comprises a plurality of disk controllers 110. Multiple disk controllers 110, each having an instance of the DBMS module 206, may be used to increase data throughput, storage capacity, and data availability. In addition, if the maximum size of data being managed by the DBMS module 206 instance is smaller than the maximum data the disk controller 110 can manage, multiple instances of the DBMS module 206 may be implemented, and the available storage devices 112 partitioned across the plurality of DBMS modules 206.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
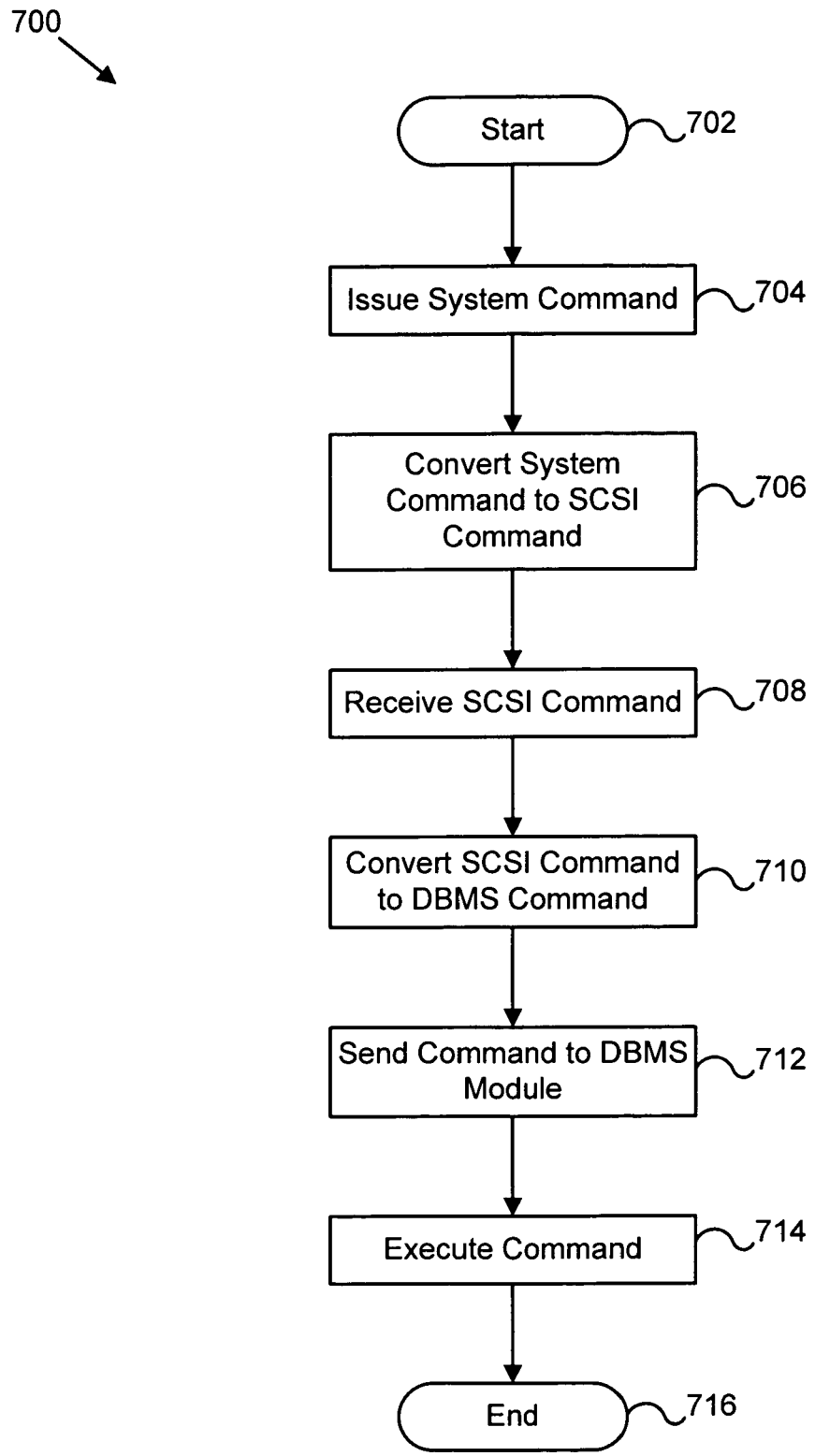
FIG. 7 is a schematic flow chart diagram illustrating one embodiment of a method for supporting storage functions in accordance with the present invention.

FIG. 7 is a schematic flow chart diagram illustrating one embodiment of a method 700 for executing a storage function in accordance with the present invention. In one embodiment, the method 700 starts 702 and the host 102 issues 704 a system command. For example, the host 102 may send read or write commands. The device driver 106 converts 706 the system command into a SCSI command for SANs or an iSCSI command for TCP/IP networks. The target code 108 receives 708 the storage command and passes the command to the conversion module 202.

In one embodiment, the conversion module 202 may convert the storage command into a DBMS command and subsequently send 712 the DBMS command to the DBMS module 206. Upon receiving the DBMS command, the DBMS module 206 executes 714 the command. If the DBMS command is a read command, the requested data is returned to the host. Alternatively, the method 700 ends 716.

Additionally, advanced storage functions may be implemented in accordance with the present invention. For example, a point in time copy function enables a business to restore data to a specified prior point in time. To achieve this using the conversion module 202 and the DBMS module 206 a DBMS online backup command may be issued and the DBMS module 206 creates backups of the DBMS table 304 and DBMS log (not shown). Using the DBMS log, the DBMS table 304 may be restored to the specified time by reversing each DBMS command in the DBMS log.

Synchronous replication may also be achieved using the conversion module 202 and the DBMS module 206. Two or more tables 304 may be defined to support a virtual device. A write command results in identical DBMS updates to the multiple tables 304. Likewise, asynchronous replication may be achieved by performing the multiple write commands at different times.

In one embodiment, the DBMS module 206 may link together a plurality of distinct networks and enable replication across the networks. For example, the networks 200, 400, 500, and 600 of FIGS. 2, 4, 5, and 6 may be in communication with a single DBMS module 206 or alternatively, a plurality of DBMS modules 206 using standard Transmission Control Protocol and Internet Protocol.

In a further embodiment, the conversion module 202 may be configured to support restoration, write once storage, and content addressable storage commands or functions. Restoration is achieved by the DBMS module 206 restoring the DBMS backup table 304 in place of a primary DBMS table 304. Write once storage with the conversion module 202 and the DBMS module 206 may comprise a unique key restraint. For example, the DBMS module 206 will prevent duplicate writes to the same sector because a write command to sector 306 *n* having identical contents 308 will be rejected due to a unique key violation.

Content addressable storage is possible because a plurality of content 308 fields is possible. For example, if a large record 302 contains an image, the name of the image may be stored in a subsequent content 308 field. The subsequent field enables a search of the image by name.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to support storage functions using an embedded database management system (DBMS), the apparatus comprising:

a disk controller receiving data input/output (I/O) requests directed to virtual block numbers from a host, wherein the I/O requests comprise Small Computer System Interface (SCSI) read commands reading the data from the virtual block numbers and SCSI write commands writing the data to the virtual block numbers, and the I/O requests are not Structured Query Language (SQL) database requests;

a memory device storing executable code;

a processor executing the executable code, the executable code comprising a conversion module translating the I/O requests into SQL database requests that each use a virtual block number as an index to a virtual block number field and communicating the SQL database requests to a DBMS module;

a table module emulating a virtual storage device and comprising a plurality of virtual block number fields storing virtual block numbers, each virtual block number field associated with a data contents field storing a location description for a physical storage device; and the DBMS module executing each SQL database request, accessing the data at the location described by the data contents field associated with the virtual block number of the SQL database request.

2. The apparatus of claim 1, wherein the virtual storage device further comprises a plurality of database records.

3. The apparatus of claim 1, further comprising a plurality of storage devices communicating with the disk controller, executing the SQL database requests, and storing data associated with the SQL database requests.

4. The apparatus of claim 1, the conversion module communicating the database request with a plurality of embedded DBMS modules and a plurality of table modules for synchronous and asynchronous replication of the data.

5. The apparatus of claim 1, wherein the I/O requests comprise Internet Small Computer System Interface (iSCSI) commands transmitted over a packet switching network.

6. The apparatus of claim 1, wherein the embedded DBMS module executes the SQL database requests over a storage area network modified to allow for Structured Query Language flow.

7. The apparatus of claim 1, wherein the conversion module is further configured to issue a database request selected from a restoration request, a write once storage request, and a content addressable storage request.

8. The apparatus of claim 1, wherein the conversion module is further configured to issue a DBMS backup command and the embedded DBMS module creates a backup of the table in response to the DBMS backup command.

9. The apparatus of claim 1, wherein the conversion module translates an I/O create virtual block request into a SQL insert command, an I/O remove virtual block request into a SQL delete request, and an I/O write once request into a SQL unique key constraint command, an I/O restoration command into a SQL restoration of the table module with a backup table module, and wherein the data contents field stores an image name for content addressable storage.

10. A system to support storage functions using an embedded database management system, the system comprising:
a network;
a plurality of storage devices coupled to the network and storing data;
a disk controller receiving data I/O requests directed to virtual block numbers from a host, wherein the I/O requests comprise SCSI read commands reading the data from the virtual block numbers and SCSI write commands writing the data to the virtual block numbers, and the I/O requests are not SQL database requests, communicating the I/O requests with the plurality of storage devices over the network, and the disk controller comprising a memory device storing executable code and a processor executing the executable code, the executable code comprising
a conversion module translating the I/O requests into SQL database requests that each use a virtual block number as an index to a virtual block number field and communicating the SQL database requests to a DBMS module;
a table module emulating a virtual storage device and comprising a plurality of virtual block number fields storing virtual block numbers, each virtual block number field associated with a data contents field storing a location description for the storage devices; and
the DBMS module executing each SQL database request, accessing the data at the location described by the data contents field associated with the virtual block number of the SQL database request.

11. The system of claim 10, wherein the virtual storage device further comprises a plurality of database records.

12. The system of claim 10, wherein the conversion module is configured to communicate the SQL database request with a plurality of embedded DBMS modules and a plurality of table modules for synchronous and asynchronous replication of the data.

13. The system of claim 10, wherein the I/O requests comprise Internet Small Computer System Interface (iSCSI) commands transmitted over a packet switching network.

14. The system of claim 10, wherein the network further comprises a packet switching network.

15. The system of claim 10, wherein the network further comprises a high-speed storage area network.

16. The system of claim 10, wherein the conversion module translates an I/O create virtual block request into a SQL insert command, an I/O remove virtual block request into a SQL delete request, and an I/O write once request into a SQL unique key constraint command, an I/O restoration command into a SQL restoration of the table module with a backup table module, and wherein the data contents field stores an image name for content addressable storage.

17. A memory device storing a program of machine readable instructions executed by a digital processing apparatus to perform operations to support storage functions using an embedded database management system, the operations comprising:
receiving data I/O requests directed to virtual block numbers from a host, wherein the I/O requests comprise read SCSI commands reading the data from the virtual block numbers and SCSI write commands writing the data to the virtual block numbers, and the I/O requests are not SQL database requests;
translating the I/O requests into SQL database requests that each use a virtual block number as an index to a virtual block number field;
communicating the SQL database requests;
emulating a virtual storage device with a table module comprising a plurality of virtual block number fields storing virtual block numbers, each virtual block number field associated with a data contents field storing a location description for a physical storage device; and
executing each SQL database request, accessing the data at the location described by the data contents field associated with the virtual block number of the SQL database request.

18. The memory device of claim 17, further comprising operations to communicate with a disk controller, execute the SQL database requests, and store data associated with the SQL database requests.

19. The memory device of claim 17, further comprising operations to communicate the SQL database request with a plurality of embedded DBMS modules and a plurality of table modules for synchronous and asynchronous replication of the data.

20. The memory device of claim 17, further comprising translating an I/O create virtual block request into a SQL insert command, an I/O remove virtual block request into a SQL delete request, and an I/O write once request into a SQL unique key constraint command, an I/O restoration command into a SQL restoration of the table module with a backup table module, and wherein the data contents field stores an image name for content addressable storage.

21. A method for supporting storage functions using an embedded database management system, the method comprising:
receiving, by user of a processor, data I/O requests directed to virtual block numbers from a host, wherein the I/O requests comprise SCSI read commands reading the data from the virtual block numbers and SCSI write commands writing the data to the virtual block numbers, and the I/O requests are not SQL database requests;

translating the I/O requests into SQL database requests that each use a virtual block number as an index to a virtual block number field;

communicating the SQL database requests;

emulating a virtual storage device with a table module comprising a plurality of virtual block number fields storing virtual block numbers, each virtual block number field associated with a data contents field storing a location description for a physical storage device; and executing each SQL database request, accessing the data at the location described by the data contents field associated with the virtual block number of the SQL database request.

22. The method of claim 21, further comprising translating an I/O create virtual block request into a SQL insert command, an I/O remove virtual block request into a SQL delete request, and an I/O write once request into a SQL unique key constraint command, an I/O restoration command into a SQL restoration of the table module with a backup table module, and wherein the data contents field stores an image name for content addressable storage.

23. A method for supporting storage functions using an embedded database management system, the method comprising:

receiving, by use of a processor, data I/O requests directed to virtual block numbers from a host, wherein the I/O requests comprise read SCSI commands reading the data from the virtual block numbers and SCSI write commands writing the data to the virtual block numbers, and the I/O requests are not SQL database requests;

translating the I/O requests into SQL database requests that each use a virtual block number as an index to a virtual block number field; communicating the SQL database requests;

emulating a virtual storage device with a table module comprising a plurality of virtual block number fields storing virtual block numbers, each virtual block number field associated with a data contents field storing a location description for a physical storage device; and executing each SQL database request, accessing the data described by the data contents field associated with the virtual block number of the SQL database request.

24. The method of claim 23, further comprising translating an I/O create virtual block request into a SQL insert command, an I/O remove virtual block request into a SQL delete request, and an I/O write once request into a SQL unique key constraint command, an I/O restoration command into a SQL restoration of the table module with a backup table module, and wherein the data contents field stores an image name for content addressable storage.

* * * * *